United States Patent [19]

Sladek et al.

[11] 4,389,625

[45] Jun. 21, 1983

[54] ELECTRICAL CONNECTOR HAVING A CAPTIVATED, ELECTRICALLY COMPENSATED INNER CONDUCTOR

[75] Inventors: Norbert J. Sladek, Fairfield; Roger P. Avery, Redding; Saverio T. Bruno, Danbury, all of Conn.

[73] Assignee: Allied Corporation, Morris Township, Morris County, N.J.

[21] Appl. No.: 138,696

[22] Filed: Apr. 9, 1980

Related U.S. Application Data

[63] Continuation of Ser. No. 918,893, Jun. 26, 1978, abandoned.

[51] Int. Cl.[3] .................... H01R 17/04; H02G 15/00

[52] U.S. Cl. .................... 333/260; 333/33; 333/245; 339/177 R

[58] Field of Search .................... 333/33–35, 333/27, 260, 245; 339/89 C, 90 C, 91 P, 136 C, 177 R, 126 J

[56] References Cited

U.S. PATENT DOCUMENTS

| | | | |
|---|---|---|---|
| 2,425,834 | 8/1947 | Salisbury . | |
| 2,518,665 | 8/1950 | Collard | 333/260 X |
| 2,546,309 | 3/1951 | Kempf | 333/177 R |
| 2,623,946 | 12/1952 | Cornes | 333/34 |
| 2,657,252 | 10/1953 | Mildner et al. . | |
| 2,995,718 | 8/1961 | Murphy | 333/260 |
| 3,010,747 | 11/1961 | Bondon | 339/177 R |
| 3,147,057 | 9/1964 | Colussi | 339/89 |
| 3,290,640 | 12/1966 | Forney, Jr. | 339/177 |
| 3,291,895 | 12/1966 | Van Dyke | 174/88 |
| 3,292,117 | 12/1966 | Bryant et al. | 333/260 |
| 3,325,752 | 6/1967 | Barker | 333/34 |
| 3,372,364 | 3/1968 | O'Keefe et al. | 339/177 |
| 3,460,072 | 8/1969 | Ziegler, Jr. | 333/33 |
| 3,492,604 | 1/1970 | Fan | 333/33 |
| 3,525,973 | 8/1970 | Kipnes | 339/177 |
| 3,660,804 | 5/1972 | Bebber, Jr. | 339/177 |
| 3,678,444 | 7/1972 | Stevens et al. | 339/130 C |
| 3,761,844 | 9/1973 | Reeder | 333/33 |
| 3,818,123 | 6/1974 | Maltz et al. | 339/88 C |
| 3,859,455 | 1/1975 | Gommans et al. . | |
| 3,872,237 | 3/1975 | Eyre et al. | 29/628 |
| 3,936,132 | 2/1976 | Hutter | 339/177 R |
| 4,035,054 | 7/1977 | Lattanzi | 339/177 R |
| 4,038,490 | 7/1977 | Miller et al. | 29/628 |

FOREIGN PATENT DOCUMENTS

| | | |
|---|---|---|
| 965509 | 11/1956 | Fed. Rep. of Germany . |
| 1301848 | 7/1967 | Fed. Rep. of Germany . |

OTHER PUBLICATIONS

Meinke et al.-"Taschenbuch der Hochfrequenz Technic", (2nd Edition) 1962, Springer Publishing Co., pp. 198–199, 204–205, 357–361.

*Primary Examiner*—Marvin L. Nussbaum
*Attorney, Agent, or Firm*—Roger H. Criss

[57] ABSTRACT

An electrical connector having inner conductor captivation with electrical compensation includes an outer conductor or shell and also includes a dielectric member disposed within the outer conductor having an axial opening extending therethrough. An inner conductor or contact is disposed within the axial opening in the dielectric member in electrical isolation from the outer conductor and means are provided for captivating the inner conductor or contact against axial and rotational movement within the opening. The connector is characterized by the captivating means providing an electrical impedance differing from the electrical impedance remote therefrom and further includes means for compensating for the differing electrical impedance provided by the captivating means adjacent thereto. With these features of construction, the connector not only effectively captivates the inner conductor but also effectively compensates for the differing electrical impedance resulting therefrom.

12 Claims, 7 Drawing Figures

ELECTRICAL CONNECTOR HAVING A CAPTIVATED, ELECTRICALLY COMPENSATED INNER CONDUCTOR

This is a continuation application of application Ser. No. 918,893, filed June 26, 1978 now abandoned.

BACKGROUND OF THE INVENTION

The present invention relates to electrical connectors and, more particularly, to a coaxial connector wherein an electrical contact or conductor is captivated or restrained from axial and rotational movement and electrically compensated to improve the voltage standing wave ratio (VSWR) of the connector.

In the past, a significant problem that has been encountered in the coaxial connector field has been to design satisfactory means for captivating the center conductor or contact of the connector against axial and rotational displacement. It has been found that axial and rotational loads may be transmitted to the center contact either directly or indirectly through the coaxial cable causing it to be dislodged or displaced from the dielectric member or core. In other words, the problem manifests itself by the center contact moving axially or rotationally relative to the outer conductor or connector shell. It is well known that axial and rotational loads on the center contact are frequently encountered during normal use of a coaxial connector causing potential signal interference or interruption. Additionally, the problem is aggravated whenever a substantial tension is placed on the cable being joined by the coaxial connector or by thermal shock which can cause relative size changes in the components of the connector.

Other proposed solutions to this problem include utilizing flanges, shoulders, barbs and the like which cooperate with the supporting dielectric member. It will be appreciated that a flange or shoulder extending outwardly from the center conductor creates a change in spacing between the outer conductor or shell and the center conductor creating electrical discontinuities which impair performance. Those skilled in the art have heretofore assumed that coaxial connector performance must always be adversely affected in terms of VSWR by the use of such physical or mechanical retaining means as flanges, shoulders, barbs and the like. It has been recognized that flanges or shoulders have excellent axial retaining capabilities with little or no rotational retaining capability.

In an attempt to overcome the problem of electrical discontinuity while at the same time providing sufficient retaining capabilities, it has been common in the art to secure the center conductor, dielectric member and outer conductor against relative axial and rotational movement by epoxy pinning. This was proposed as a means for retaining the components in a desired relative position of assembly without causing significant electrical discontinuities which might impair the electrical characteristics of a coaxial connector. Epoxy pinning disclosed, for example, in U.S. Pat. No. 3,292,117, has nevertheless proven to be less than completely desirable due in part to the fairly complicated assembly process required.

With epoxy pinning, the surface to be bonded must be clean and free of dirt, oil, grease, tarnish, and other foreign materials to achieve a good bond and a satisfactory seal. This requires solvent cleaning by wiping with a clean, lint-free cloth or a paper wiper moistened with a suitable solvent. The bonding operation then must be performed as soon as possible upon completion of final cleaning to assure that the surface does not become contaminated in the interim. This requires thorough blending at the precise time of need due to the relative short pot life of epoxy. After the epoxy has been applied, it must be heat-cured for several hours and/or room temperature cured for approximately one day.

In order to overcome some of the inherent difficulties with epoxy pinning, physical or mechanical retaining means for the center conductor have been reviewed with a renewed interest. The design must take into consideration that the dielectric member is usually of a relatively smooth and frictionless material such as the synthetic resin polymer sold under the trademark Teflon. It is well appreciated that such a material does not frictionally grip the center conductor adequately to prevent axial and rotational movement of the center conductor relative to the remainder of the coaxial connector especially after repeated engagement and disengagement. Electrical connectors generally, and coaxial connectors in particular, must therefore be designed to minimize the possibility of a shift in the inner conductor or contact of the connector which could result in improper mating and orientation of components causing electrical discontinuities. As a result, any physical or mechanical retaining means for the inner conductor or contact must necessarily embrace all of these considerations.

SUMMARY OF THE INVENTION

Accordingly, the present invention is directed to an electrical connector wherein an inner electrical contact or conductor is captivated or restrained from axial and rotational movement and electrically compensated to improve the voltage standing wave ratio (VSWR) of the connector. The connector includes an outer conductor or shell and also includes a dielectric member disposed within the outer conductor having an axial opening extending therethrough. An inner conductor or contact is disposed within the axial opening in the dielectric member in electrical isolation from the outer conductor and means are provided for captivating the inner conductor against axial and rotational movement within the opening. The connector is characterized by the captivating means providing an electrical impedance differing from the electrical impedance remote therefrom and further includes means for compensating for the differing electrical impedance provided by the captivating means adjacent thereto. With these features of construction, the connector of the present invention not only effectively captivates the inner conductor but also effectively compensates for the differing electrical impedance resulting therefrom.

Other features of the present invention include the dielectric member being formed of a deformable material permitting radially outward expansion of the axial opening. The inner conductor preferably has a diameter generally the same as the diameter of the axial opening. The compensating means includes at least one undercut portion of reduced diameter along the inner conductor with the captivating means including at least one knurled retaining portion of increased diameter along the inner conductor. The compensating means in one preferred embodiment includes a pair of undercut portions axially spaced apart with the captivating means including a single knurled retaining portion extending between the pair of undercut portions. In another preferred embodiment, the captivating means includes a pair of knurled retaining portions axially spaced apart with the compensating means including a single undercut portion of reduced diameter extending between the pair of knurled retaining portions.

As will be appreciated, the inventive concepts of the present invention are well suited for utilization in any coaxial connector of the type comprising an outer conductor or shell, a deformable dielectric member disposed within the outer conductor and having an axial bore extending therethrough, and a center contact disposed within the axial bore in electrical isolation from the outer conductor. The captivation of the center contact against axial and rotational movement within the axial bore will be provided by a suitable contact retaining portion which is preferably generally cylindrical in shape and concentric with the center contact and provides an electrical impedance differing from the electrical impedance remote therefrom which is compensated for by means adjacent thereto. While the contact retaining portion provides center contact captivation, the compensating means provides electrical compensation for the differing electrical impedance resulting therefrom permitting use of physical or mechanical retention of the center contact of a coaxial connector of the type described without the problems inherent in the prior art.

As before, the contact retaining portion has a diameter greater than the diameter of the axial bore so as to cooperate in interference fit fashion with the dielectric member. The compensating means can again include a pair of undercut portions of reduced diameter disposed along the center contact on either side of the contact retaining portion. It has been found advantageous for the retaining member to have a knurled outer surface so as to cooperate in gripping engagement fashion with the dielectric member. The contact retaining portion will again characteristically provide an electrical impedance lower than the electrical impedance remote therefrom. However, the compensating means provides an electrical impedance higher than the electrical impedance of the contact retaining portion and higher than the electrical impedance remote therefrom permitting the contact retaining portion and the compensating means to be selected so as to provide impedance matching.

In another embodiment, a pair of contact retaining portions spaced apart from one another are provided for captivating the center contact against axial and rotational movement within the axial bore of the dielectric member. The contact retaining portions will again be generally cylindrical in shape and concentric with the center contact and will again provide an electrical impedance lower than the electrical impedance remote therefrom. Once again, means for compensating for the lower electrical impedance caused by the contact retaining portions will be provided adjacent thereto.

The contact retaining portions will again have a diameter greater than the diameter of the axial bore so as to cooperate in interference fit fashion with the dielectric member. The compensating means will now include a single undercut portion of reduced diameter disposed along the center contact and extending between the contact retaining portions. It is again contemplated that the contact retaining portions will have knurled outer surfaces so as to cooperate in gripping engagement fashion with the dielectric member. Once again, the compensating means will provide an electrical impedance higher than the electrical impedance of the contact retaining portions and higher than the electrical impedance remote therefrom permitting the contact retaining portions and the compensating means to be selected so as to provide impedance matching.

The present invention is therefore directed to a connector wherein an electrical contact or conductor is captivated or restrained from axial and rotational movement and electrically compensated to improve the voltage standing wave ratio (VSWR) of the connector. It is among the objects of the present invention to provide physical or mechanical axial and rotational captivation of the inner conductor or contact relative to the dielectric member of an electrical connector while electrically compensating the off impedance (i.e., electrical discontinuity) section of the connector caused by the physical or mechanical captivation. Still other objects and advantages of the present invention will be appreciated from a consideration of the details of construction and operation set forth in the accompanying specification, claims and drawings.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings. In the drawings, like reference numerals identify like elements in the several figures in which:

DETAILED DESCRIPTION OF THE PREFERRED EMBODIMENT

Figure 1:
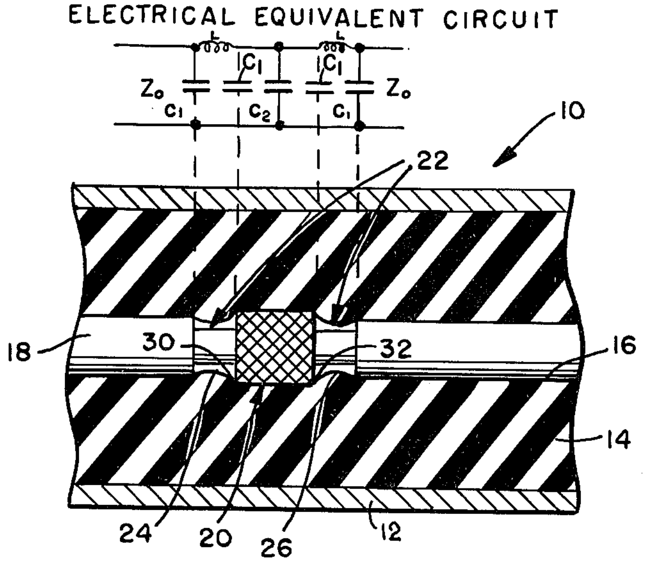
FIG. 1 is a partial cross-sectional view of a portion of a coaxial connector utilizing center conductor captivation with electrical compensation in accordance with the present invention.
Figure 2:
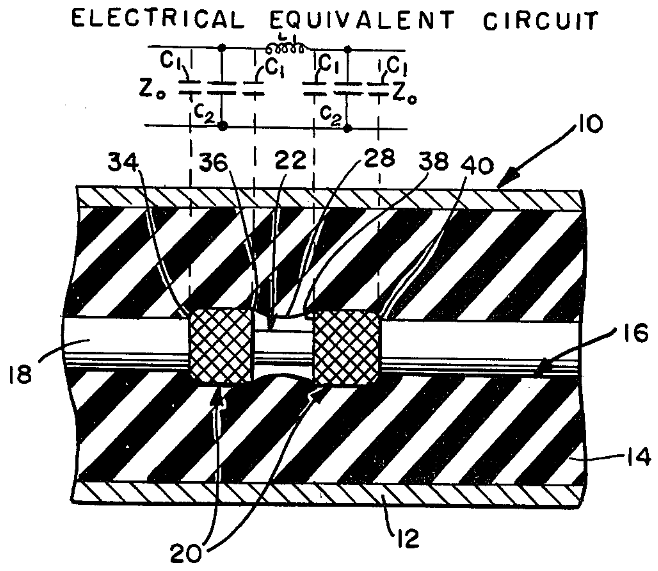
FIG. 2 is a partial cross-sectional view of a portion of another embodiment of a coaxial connector utilizing center conductor captivation with electrical compensation in accordance with the present invention.

In the illustration given and with reference first to FIGS. 1 and 2 wherein two embodiments of the present invention are shown, the reference numeral 10 designates generally electrical connectors constructed in accordance with the present invention. In each of the particular embodiments shown, the connector is of the coaxial type and includes a shell or outer conductor 12 and also includes a dielectric member 14 disposed within the outer conductor 12 having an axial opening 16 extending therethrough. An inner conductor or contact such as center contact 18 is disposed within the axial opening 16 in the dielectric member 14 in electrical isolation from the outer conductor 12 and means 20 are provided for captivating or restraining the center contact 18 against axial and rotational movement within the opening 16. The coaxial connector 10 is further characterized by the captivating means 20 providing an electrical impedance differing from the electrical impedance remote thereform and further includes means 22 for compensating for the differing electrical impedance provided by the captivating means 20 adjacent thereto. With these features of construction, the present invention not only effectively captivates the center conductor 18 against axial and rotational movement but also effectively compensates for the differing electrical impedance resulting therefrom.

Figure 7:
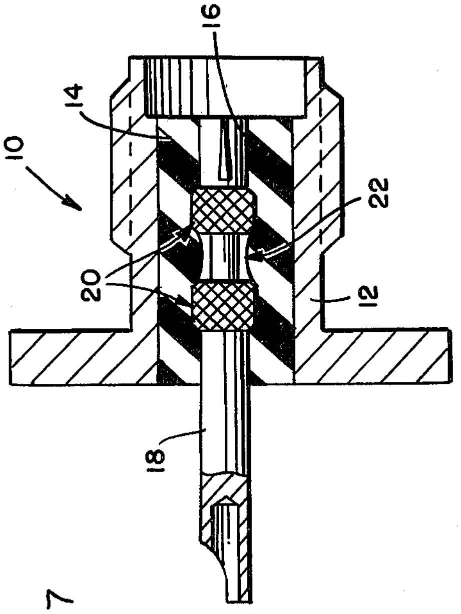
FIG. 7 is a partial cross-sectional view of a coaxial connector embodiment utilizing center conductor captivation with electrical compensation in accordance with FIG. 2.

In both embodiments, the dielectric member 14 is formed of a deformable material permitting radially outward expansion of the axial opening 16. The center contact 18 preferably has a diameter generally the same as the diameter of the axial opening 16 in its unexpanded condition. The compensating means 22 includes at least one undercut portion of reduced diameter along the center contact 18 (as shown in FIGS. 2 and 7). The captivating means 20 includes at least one knurled retaining portion having a diameter greater than the diameter of the remainder of center contact 18.

Referring to the embodiment illustrated in FIG. 1, the center contact 18 includes a pair of undercut portions 22 of reduced diameter axially spaced apart. A single knurled retaining portion 20 will then extend between the pair of undercut portions 22 although in another preferred embodiment (shown in FIG. 2), a pair of knurled retaining members or portions 20 may be provided axially spaced apart. When this latter embodiment is utilized, a single undercut portion 22 will extend between the pair of knurled retaining portions 20.

From the above, it is believed clear that the inventive concepts of the present invention are well suited for utilization in any electrical connector of the type comprising a shell or outer conductor, a deformable dielectric member disposed within the outer conductor or shell and having an axial bore extending therethrough, and an inner conductor or contact disposed within the axial bore in electrical isolation from the outer conductor or shell. The captivation of the inner conductor or contact against axial and rotational movement within the axial bore will be provided by a suitable retaining portion which is preferably generally cylindrical in shape and concentric with the inner conductor or contact and provides an electrical impedance differing from the electrical impedance remote therefrom (i.e., the remainder of the conductor or contact) which is compensated for by means adjacent thereto. While the retaining portion provides conduction or contact captivation, the compensating means provides electrical compensation for the differing electrical impedance resulting therefrom permitting use of physical or mechanical retention of the inner conductor 18 or contact of an electrical connector of the type described without the problems inherent in the prior art.

In the particular embodiment illustrated in FIG. 1, the contact retaining portion 20 has a diameter greater than the diameter of the axial bore 16 so as to cooperate in interference fit fashion with the dielectric member 14. The compensating means 22 can again include a pair of undercut portions of reduced diameter disposed along the center contact 18 on either side of the contact retaining portion 20. Advantageously, the contact retaining portion 20 has a knurled outer surface so as to cooperate in gripping engagement fashion with the dielectric member 14. The contact retaining portion 20 will again characteristically provide an electrical impedance lower than the electrical impedance remote therefrom. Since the compensating means 22 provides an electrical impedance higher than the electrical impedance of the contact retaining portion 20 and higher than the electrical impedance remote therefrom, the contact retaining portion 20 and the compensating means 22 can be selected so as to provide impedance matching.

In the embodiment illustrated in FIGS. 2 and 7, the coaxial connector 10 again includes an outer conductor 12, a dielectric member 14, and a center conductor 18. The dielectric member 14 is again disposed within the outer conductor 12 and again has an axial bore 16 extending therethrough. It is again preferably formed of a deformable material permitting radially outward expansion of the axial bore 16. The center conductor or contact 18 is again disposed within the axial bore 16 in electrical isolation from the outer conductor 12. However, in contrast to the embodiment of FIG. 1, a pair of contact retaining portions 20 spaced apart from one another are provided for captivating the center conductor 18 against axial and rotational movement within the axial bore 16.

As will be seen in FIGS. 2 and 7, the retaining members 20 are again generally cylindrical in shape and concentric with the center contact 18. It will again be recognized that the contact retaining portions 20 will provide an electrical impedance lower than the electrical impedance remote therefrom. Once again, means 22 for compensating for the lower electrical impedance caused by the contact retaining portions 20 will be provided adjacent thereto.

Other details of the embodiment of FIGS. 2 and 7 include the contact retaining portions 20 having a diameter greater than the diameter of the axial bore 16 so as to cooperate in interference fit fashion with the dielectric member 14. The compensating means 22 will now include a single undercut portion of reduced diameter disposed along the center contact and extending between the contact retaining portions 20. It will again be seen that the contact retaining portions 20 have knurled outer surfaces so as to cooperate in gripping engagement fashion with the dielectric member 14. The compensating means 22 will again provide an electrical impedance higher than the electrical impedance of the contact retaining portions 20 and higher than the electrical impedance remote therefrom. By selecting desired design criteria, the contact retaining portions 20 and the compensating means 22 can be chosen so as to provide impedance matching.

Referring to FIGS. 1 and 2, the deformable nature of the dielectric member 1 is clearly illustrated. It will be seen, for instance, that the dielectric member 14 protrudes inwardly as at 24 and 26 (as shown in FIG. 1) and protrudes inwardly as at 28 (as shown in FIG. 2). The inward protrusions 24, 26 and 28 occur at the locations of the corresponding undercut portions 22 of reduced diameter where the axial bore 16 attempts to resume its normal non-deformed diameter. It will be appreciated that the greater diameter of each contact retaining portion 20 results in radially outward expansion or deformation of the axial bore 16 causing the protrusions 24, 26 and 28 to form. With the knurled outer surface of the contact retaining portions 20, the center contacts 18 are firmly retained within the axial bore 16 of the dielectric member 14 against axial and rotational movement.

If any axial loading is placed on the center contact 18 illustrated in FIG. 1, one of the contact retaining end faces 30 or 32 will resist axial movement because of engagement with the corresponding protruding dielectric portion 24 or 26; additionally, the knurled surfaces grip the dielectric axial bore 16. It will be appreciated that rotational loading on the center contact 18 will be resisted by the knurled outer surface of the contact retaining portion 20 which advantageously utilizes diamond shaped knurls. The contact retaining portion 20 is, of course, positioned within the axial bore 16 of the dielectric member 14 in interference fit fashion and the knurled outer surface thereof cooperates with the surface of the dielectric member 14 defining the axial bore 16 in gripping engagement fashion. It will be appreciated that the use of a pair of retaining members 20 (as shown in FIG. 2) similarly results in highly effective captivation of the center contact 18. However, two of the contact retaining end faces 34, 36, 38, 40 of the retaining members 20 will cooperate with the dielectric member 14 to resist axial movement in this embodiment.

Since the diameter of the contact retaining portion 20 is greater than the diameter of the remainder of the center contact 18, the electrical impedance through the contact retaining portion 20 is lower than the characteristic electrical impedance of the coaxial connector 10. The reduced diameter portion or section 22 of the center contact 18 on either side of the knurled portion 20 (as shown in FIG. 1) provides two high impedance sections which substantially cancel the reflections from the low impedance section when the diameter and length of the high impedance sections 22 are selected to compensate for the impedance and length of the knurled portion 20. Electrically, this can be represented by a "T" type low pass filter in the equivalent circuit shown in FIG. 1 where the inductors L and capacitor $C_2$ form the "T" network. Capacitors $C_1$ represent discontinuity capacitances.

In practice, the diameter of the knurled portion 20 is chosen so that an interference/gripping fit between the knurled portion 20 and the dielectric member 14 is obtained. In general, the greater the interference between the knurled portion 20 and the dielectric member 14, the higher the forces required to cause axial or rotational movement of the center contact 18. However, if the interference is too great, then material will be removed from the surface of the dielectric member defining the axial bore 16 when the center conductor 18 is inserted. Of course, removing the material will degrade the retention effectiveness of the knurled portion 20. Accordingly, it is highly desirable to design the knurled portion 20 so that this will not occur.

Referring to FIG. 2, the undercut portion or high impedance section 22 is located between the two knurled portions 20 of the center contact 18. The high impedance section 22 cancels the reflections caused by the low impedance sections 20 when the diameter and length of the high impedance section 22 are selected to compensate for the impedance and length of the knurled portions 20. Electrically, this is represented by a "Pi" type low pass filter in FIG. 2 where the inductor L and capacitors $C_2$ form the "Pi" network. Capacitors $C_1$ represent discontinuity capacitances.

DESIGN CRITERIA

Analysis has shown that the embodiment illustrated in FIGS. 2 and 7 generally provides lower VSWR and higher retention characteristics than the embodiment illustrated in FIG. 1. VSWR curves were calculated for representative connectors having (1) a contact with an uncompensated knurled portion (i.e., having no undercut portions, (2) a contact having a compensated high-low-high impedance configuration (as illustrated in FIG. 1), (3) a contact having a compensated low-high-low impedance configuration (as illustrated in FIGS. 2 and 7), and (4) an epoxy pinned center contact (as found in the prior art). These calculations were based upon a length for the single knurled portion of 0.062" and lengths for each of the pair of knurled portions of 0.035" which have been predetermined to be advantageous for obtaining fully acceptable axial and rotational captivation in subminiature (SMA) coaxial connectors. The VSWR was then optimized by changing only the length of the high impedance section or sections 22 to vary the impedance thereof. These VSWR curves are all clearly illustrated in FIG. 3 which demonstrates the theoretical desirability of the inventive concepts of the present invention over the broad band range of 2 to 18 GHz.

In development of the present invention, one design objective was to find a physical or mechanical center contact captivation alternative to the epoxy pinning technique frequently used in SMA connectors so as to be free of the adverse aspects of the latter means of retention discussed hereinabove. It was a further objective for any new method to provide axial and rotational captivation of the center contact equal to or better than the epoxy pinning technique in a manner in which the mechanical captivation characteristics would be maintained even after exposure to thermal shock and long term exposure to elevated temperature. In addition to the mechanical captivation requirements, another design objective was to establish VSWR less than or equal to the epoxy pinning technique over the broad band range of 2 to 18 GHz.

EXAMPLE

While the inventive concepts of the present invention will have widespread use, the parameters developed for an SMA coaxial connector will be discussed by way of example hereinafter. It will be appreciated by those skilled in the art that the inventive concepts are equally applicable and can be extended to other connectors as well. Accordingly, the parameters discussed hereinafter are set forth by way of example and not limitation for purposes of better illustrating the inventive concepts of the present invention.

It was found that for the center contact of one SMA coaxial connector, a 0.060" diameter knurled retaining portion 0.062" long provides superior axial and rotational captivation when the diameter of the axial bore extending through the dielectric member is preferably 0.050" providing approximately 0.010" interference between the knurled retaining portion and the dielectric member. However, the greater diameter of the knurled retaining portion lowers the characteristic impedance of the connector from 50 ohms to 45 ohms through that zone. It will be appreciated by those skilled in the art that this decrease in impedance causes an increase in the VSWR of the SMA coaxial connector which is shown graphically in terms of the theoretical calculated VSWR versus frequency for the knurled retaining portion without electrical compensation in FIG. 3.

To compensate for this increase in VSWR, the high-low-high and low-high-low impedance configurations of the connectors shown in FIGS. 1 and 2, respectively, were theoretically and experimentally investigated. These compensating zones consist of a low impedance zone (knurled portion) separating two high impedance zones (FIG. 1) or a high impedance zone (undercut portion) separating two low impedance zones (FIG. 2). The high impedance zone or zones are reduced diameter sections on the center contact used to substantially cancel the reflections from the increased diameter sections of the low impedance zone or zones. As previously discussed, the high-low-high impedance zones can be represented by a "T" type low pass filter (FIG. 1) and the low-high-low zones can be represented by a "Pi" type low pass filter (FIG. 2).

Figure 3:
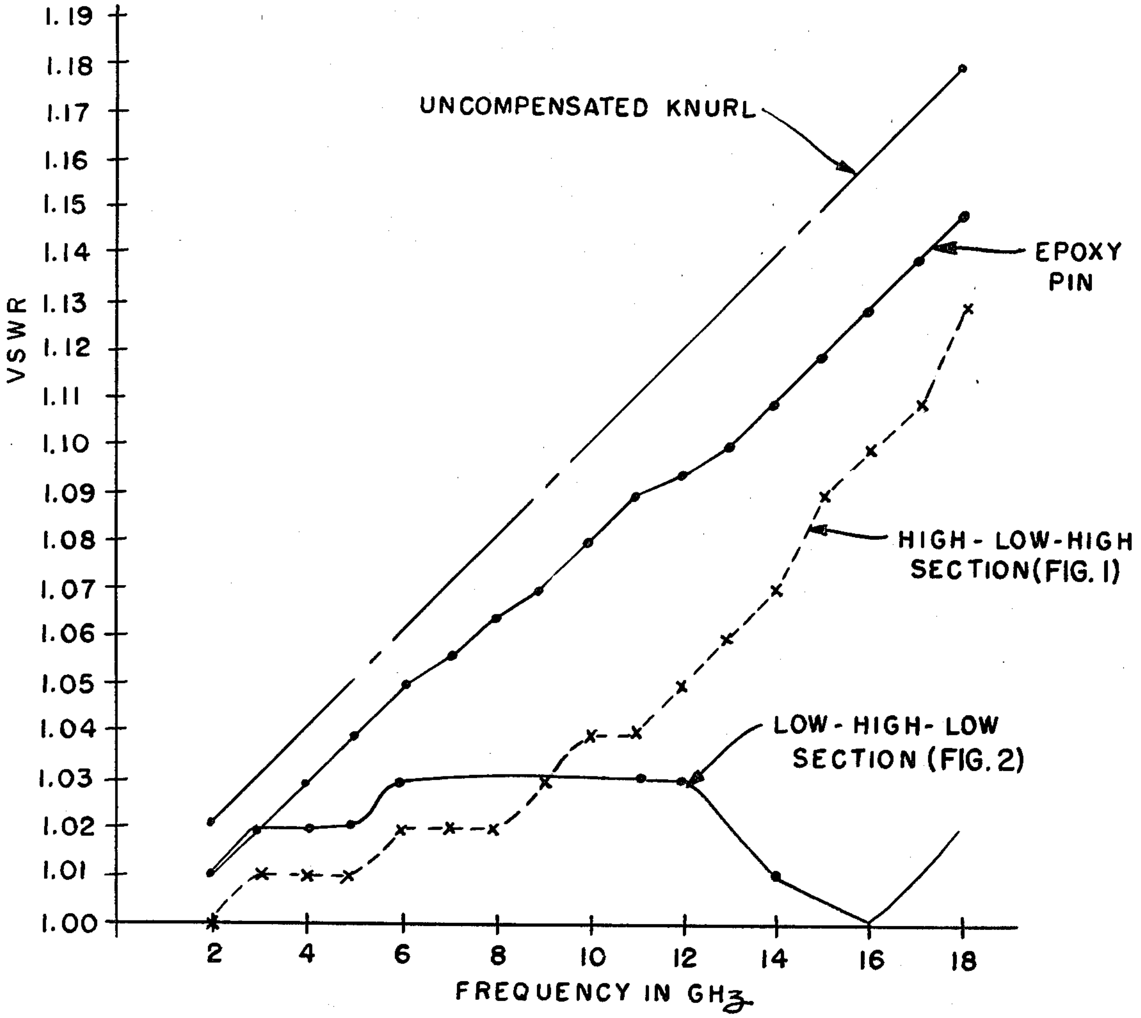
FIG. 3 is a graph illustrating a theoretical, calculated comparison of VSWR characteristics of exemplary embodiments of the invention and of an exemplary prior art device.

In designing the high-low-high zones, the length of the knurled portion was established as 0.062" to provide the desired mechanical retention characteristics. The exact impedance of the knurled portion and the length of the two undercut portions needed to compensate for the impedance difference were then computer calculated. This was done to optimize the VSWR from 2 to 18 GHz by adjusting the impedance and the lengths of the undercut portions, i.e., the high impedance zones. The low impedance zone had an impedance of 45 ohms and each high impedance zone should have an impedance of 55 ohms and a length of 0.030" to compensate for the low impedance zone. It was found that a lower VSWR could be obtained by reducing the length of the knurled portion although the reduced length caused a corresponding reduction in the mechanical retention characteristics. A graphical illustration of the theoretical calculated VSWR versus frequency for high-low-high compensation is shown in FIG. 3 and an electrical equivalent circuit is shown in FIG. 1. It should be noted that the discontinuity capacitances due to the steps in the center contact were also included in the VSWR calculation.

The design of the low-high-low zones was similar to the design of the high-low-high zones. The length of the two knurled portions were set at 0.030" to provide the desired mechanical retention characteristics and the impedance and length of the undercut portions were then computer calculated. These values were then altered slightly by increasing each of the 0.030" long knurled portions to 0.035" which lowered the VSWR slightly. The lowest theoretical calculated VSWR was obtained with 0.035" long low impedance zones (knurled portions) of 45 ohms separated by a 0.047" long high impedance zone (undercut portion) of 55 ohms. A graphical illustration of the theoretical calculated VSWR versus frequency for low-high-low compensation is also shown in FIG. 3 and an electrical equivalent circuit is shown in FIG. 2. It again should be noted that the discontinuity capacitances due to the steps in the center contact were included in the VSWR calculations.

An attempt to analyze the VSMR of the epoxy pinned center contact captivation technique was also undertaken. For the analysis, a dielectric constant of 2.85 was used which was determined by filling a section of coaxial transmission line with epoxy and measuring the impedance. By knowing the inner diameter of the outer conductor and the outer diameter of the center contact, the dielectric constant could be calculated. A graphical illustration of the theoretical calculated VSWR versus frequency for the epoxy pinned center contact captivation technique is also shown in FIG. 3.

A test fixture was utilized to obtain test data on the VSWR characteristics of the two embodiments of the invention shown herein and the various other captivation techniques previously discussed. More particularly, a test fixture utilizing the assignee's APC-3.5 ® connectors, a 3.5 mm airline, and a replaceable center section was designed to accept a short section of a dielectric member which contained one of the following: (1) a precision 50 ohm center conductor, (2) a center conductor which had an uncompensated 0.062" long knurled retaining portion, (3) a center conductor which had a high-low-high impedance structure such as that shown in FIG. 1, (4) a center conductor which had a low-high-low impedance structure such as that shown in FIG. 2, and (5) a center conductor which was epoxy pinned. The precision 50 ohm test section was initially inserted into the airline and the VSWR of the assembly was measured and stored so that it could be subtracted from all future measurements. Once the precision 50 ohm test section had been measured and stored, the remaining test sections were inserted sequentially into the airline and the VSWR's were measured for the test sections.

Figure 4:
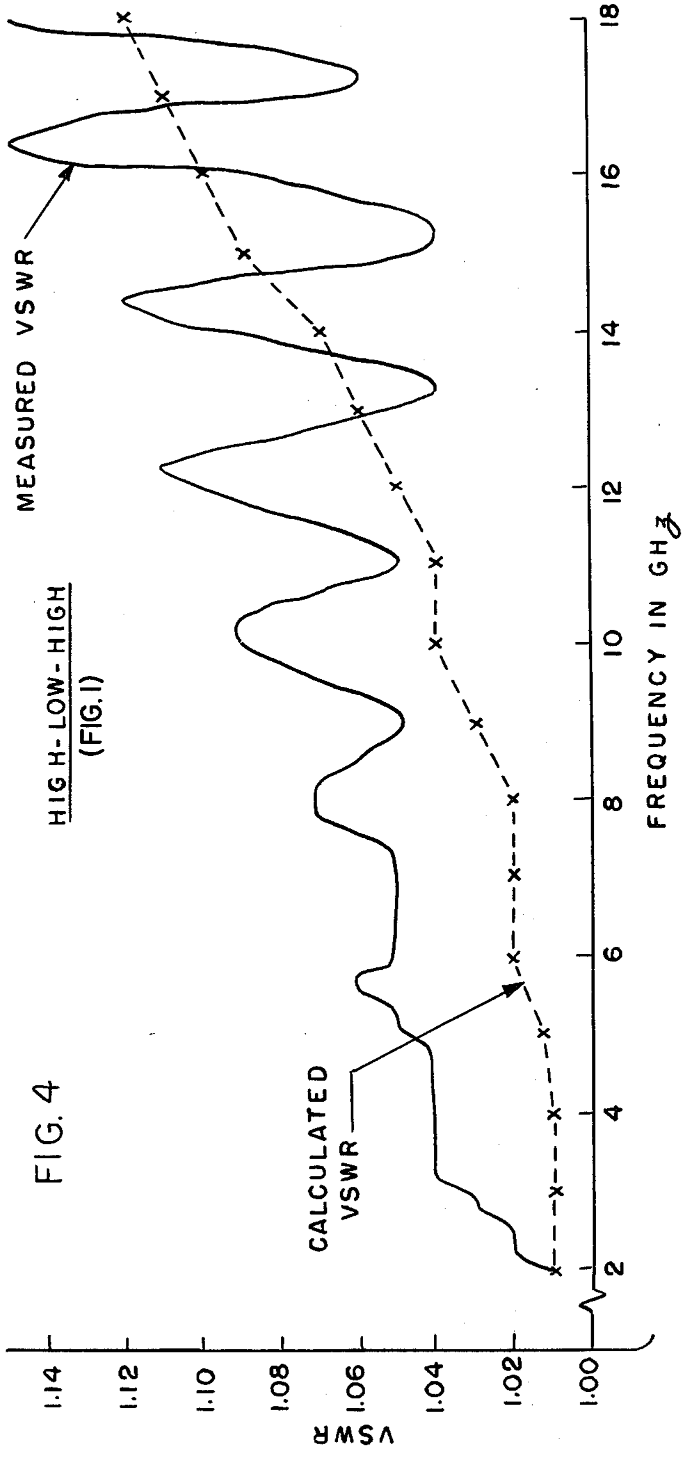
FIG. 4 is a graph illustrating a comparison of the calculated and measured VSWR characteristics of an exemplary embodiment of the invention in accordance with FIG. 1.
Figure 5:
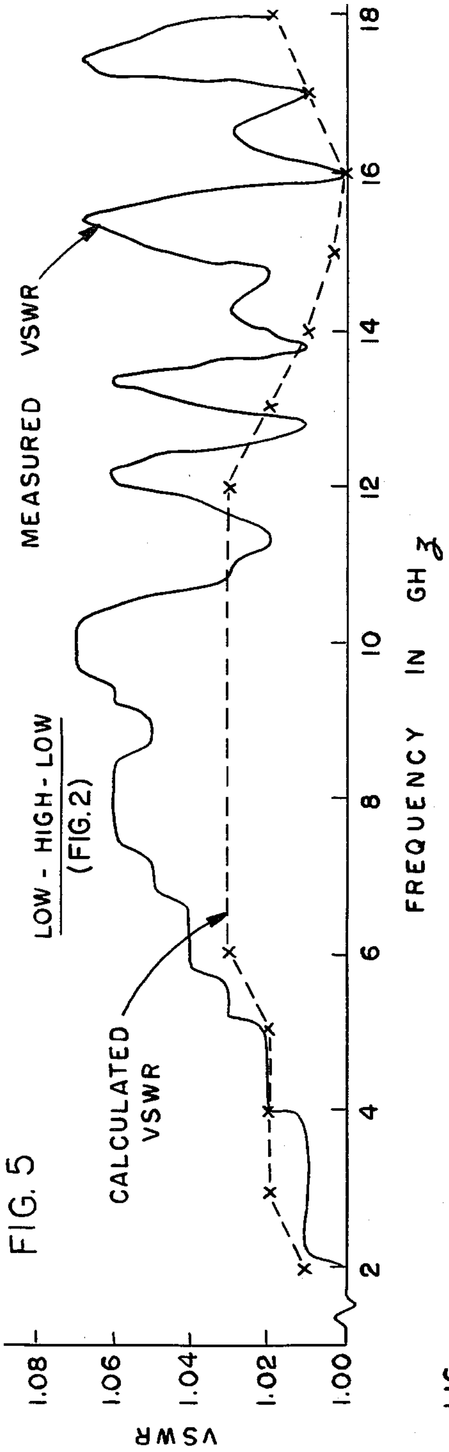
FIG. 5 is a graph illustrating a comparison of the calculated and measured VSWR characteristics of an exemplary embodiment of the invention in accordance with FIG. 2.
Figure 6:
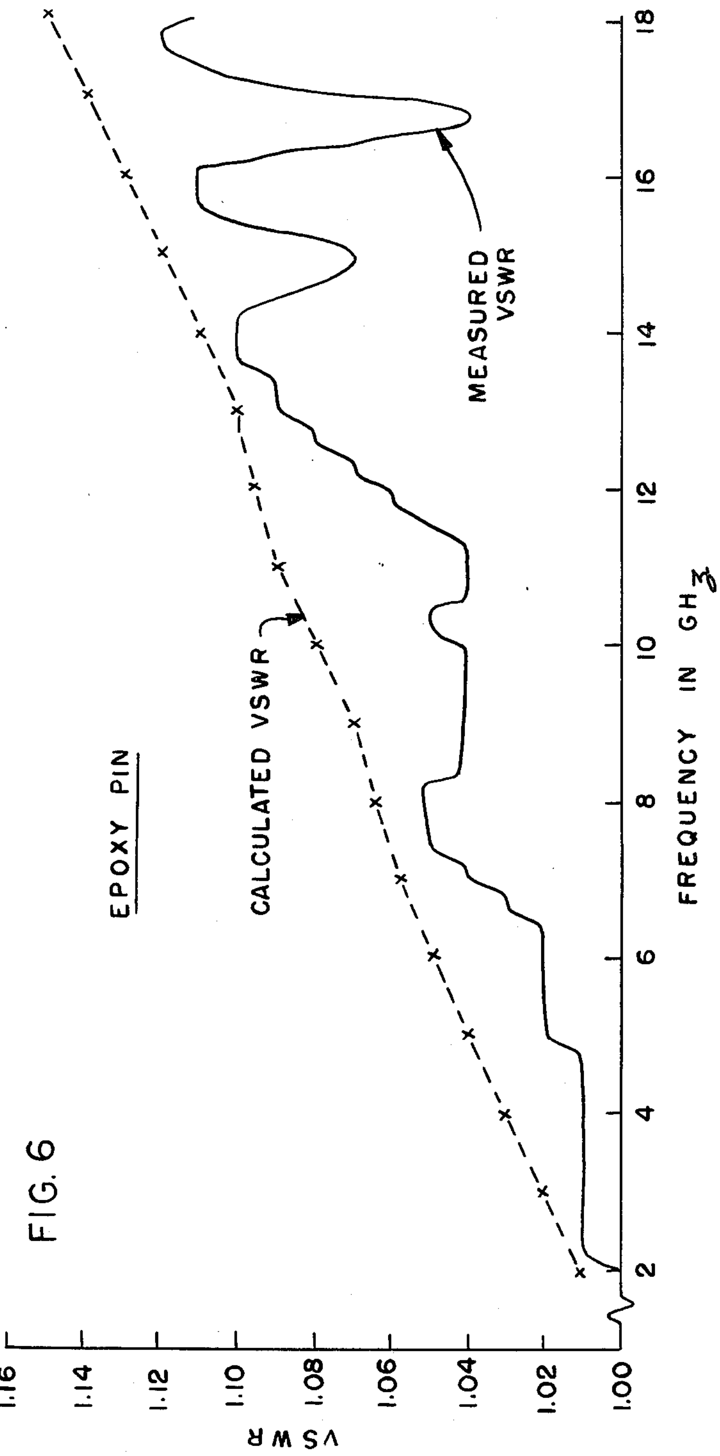
FIG. 6 is a graph illustrating a comparison of the calculated and measured VSWR characteristics of an exemplary prior art device.

Referring to FIGS. 4 through 6, the measured VSWR shows general agreement with the theoretical calculated values. The test results show that the low-high-low compensation produces lower VSWR than both the high-low-high compensation and the epoxy pinned center contact captivation. Since the VSWR characteristics fell well within acceptable ranges, the coaxial connector of the present invention was mechanically tested to determine the retention characteristics of the center contact captivation.

In order to perform the mechanical test, a test fixture conforming in length to a standard SMA receptacle was used. The internal dimensions for the center contact, dielectric member, and the outer conductor were also the same as for a standard SMA receptacle. Contacts and dielectrics were fabricated to the worst case tolerance condition (minimum press fit) in order to establish the values of minimum axial and rotatinal force resistance.

Test fixtures containing epoxy pinned center contacts, center contacts utilizing a single knurled retaining portion and center contacts utilizing a pair of knurled retaining portions were separated into groups and subjected to various environmental tests. The environmental tests included ambient (room temperature), thermal shock per Mil-Std.-202, Method 107, Condition C, and temperature bake at 125° C. for 168 hours. Test data show that physical or mechanical retention with knurled retaining portions provide greater resistance to torque under all conditions while the resistance to axial force is greater under ambient conditions and somewhat less after thermal shock and temperature bake than the epoxy pinned center contact captivation technique.

Comparing the electrical and mechanical test results shows that knurling the center contact for captivation within the dielectric is overall an improvement over the epoxy pinned center contact captivation technique. The low-high-low compensation (two knurled retaining portions each 0.035" long separated by a 0.047" long undercut portion) produces a lower VSWR than the presently used epoxy pinned center contact captivation technique (compare FIGS. 5 and 6) and provides increased retention under torque. The high-low-high compensation (one knurled retaining member 0.062" long separated by a pair of 0.030" long undercut portions) produces generally comparable VSWR to the epoxy pinned center contact captivation technique (compare FIGS. 4 and 6) and also provides increased retention under torque. Both the low-high-low impedance network and the high-low-high impedance network provide fully acceptable levels of axial and rotational captivation in a coaxial connector capable of superior electrical performance by reason of electrical compensation.

As will be apparent to those skilled in the art, the techniques employed in the above example can be utilized to design suitable inner conductor or contact captivation with electrical compensation for a wide variety of electrical connectors. The design parameters will, in each case, depend upon the retention and compensation characteristics required for a particular connector. However, it is believed advantageous to first select the diameter and length of the knurled retaining portion or portions after which the diameter and length of the undercut portion or portions can be determined to accomplish impedance matching.

Referring again briefly to FIGS. 1, 2 and 7, it will be seen that no means are shown for securing the dielectric member 14 against movement relative to the outer conductor 12. Any practical application will require that the dielectric member 14 be axially and rotationally captivated as well. While not forming a part of the inventive concepts of the present invention, it will be appreciated that the dielectric member 14 can be secured against movement by any means including such conventional means as pinning, staking, or the like.

The present invention successfully achieves the objective of providing physical or mechanical retaining means for captivating the center contact of a coaxial connector. This is achieved by using high impedance zones of proper value and position to cancel the reflections caused by the low impedance zones which are characteristic of the retention feature. The use of a knurled interference/gripping fit eliminates time consuming epoxy filling of the connector to provide captivation and also eliminates special fixturing of the center contact and the lengthy curing time required for the latter technique. This is achieved without reducing the overall effectiveness of the coaxial connector in terms of electrical performance and retention characteristics. The present invention provides axial and rotational captivation of the center contact relative to the dielectric member of a coaxial connector while electrically compensating the off (i.e., electrical discontinuity) section of the connector caused by the physical or mechanical captivation in a manner achieving or surpassing the levels of performance normally associated with epoxy pinned center contact captivation.

While in the foregoing specification a detailed description of the invention has been set forth for purposes of illustration, the details herein given may be varied by those skilled in the art without departing from the spirit and scope of the invention as defined by the appended claims.

We claim:

1. In an electrical connector having a first conductor disposed within an axially extending opening through a dielectric member disposed adjacent a second conductor, the improvement comprising:

means for captivating said first conductor against axial and rotational movement within said axially extending opening;

said captivating means having an electrical impedance between said captivating means and said second conductor differing from the characteristic electrical impedance of said first conductor between said first conductor and said second conductor; and means for compensating for the differing electrical impedance of said captivating means to optimize the voltage standing wave ratio of said electrical connector;

said dielectric member being deformable to permit radial expansion of said axially extending opening and wherein said captivating means includes at least one enlarged portion of said first conductor for radially expanding said axially extending opening to retain said first conductor in an interference fit in said axially extending opening, said enlarged portion of said conductor having an electrical impedance between said first conductor and said second conductor less than the characteristic electrical impedance of the remainder of said first conductor between said first conductor and said second conductor.

2. The improvement of claim 1 wherein said enlarged portion of said first conductor is generally cylindrical in shape and concentric with the remainder of said first conductor, said enlarged portion of said conductor having a diameter greater than the diameter of the remainder of said first conductor and a knurled outer surface for engaging said dielectric member to restrain said first conductor against rotational movement within said axially extending opening.

3. The improvement of claim 1 wherein said compensating means includes at least one undercut portion of said first conductor, said undercut portion having a diameter less than the diameter of the remainder of said first conductor and an electrical impedance greater than the characteristic electrical impedance of said first conductor, said undercut portion of said first conductor being dimensioned to compensate for the lesser electrical impedance of said enlarged portion.

4. The improvement of claim 3 wherein said first conductor includes a pair of said undercut portions in axially spaced relation along said first conductor and said enlarged portion extends between said undercut portions, said undercut portions being dimensioned to cooperatively compensate for the lesser electrical impedance of said enlarged portion.

5. The improvement of claim 3 wherein said first conductor includes a pair of said enlarged portions in axially spaced relation along said first conductor and said undercut portion extends between said enlarged portions, said undercut portion being dimensioned to compensate for the lesser electrical impedance of said enlarged portions.

6. A coaxial connector comprising:

an electrically conductive shell;

a dielectric member disposed within said shell and having an axially extending bore therethrough; and an electrical contact disposed within said axially extending bore in electrical isolation from said shell, said contact having an enlarged contact retaining portion for engaging said dielectric member in an interference fit to restrain said contact against axial and rotational movement within said axially extending bore, said enlarged contact retaining portion having an electrical impedance between said contact and said shell less than the characteristic electrical impedance of the remainder of said contact between said contact and said shell, and said contact having a pair of undercut portions of lesser diameter than the remainder of said contact on opposite ends of said enlarged contact retaining portion, said undercut portions being dimensioned to have greater electrical impedances between said contact and said shell than the characteristic electrical impedance of the remainder of said contact between said contact and said shell and compensate for the lesser electrical impedance of said enlarged contact retaining portion.

7. The coaxial connector of claim 6 wherein said enlarged contact retaining portion is generally cylindrical in shape and concentrically formed with said contact, said enlarged contact retaining portion having a diameter greater than the diameter of the remainder of said contact and deforming said dielectric member thereabout to retain said contact in an interference fit in said axially extending bore to restrain said contact against axial movement, said enlarged contact retaining portion having a knurled outer surface for engaging said dielectric member to restrain said contact against rotational movement.

8. A coaxial connector comprising:

an electrically conductive shell;

a dielectric member disposed within said shell and having an axially extending bore therethrough; and an electrical contact disposed within said axially extending bore in electrical isolation from said shell, said contact having a pair of axially spaced enlarged contact retaining portion for engaging said dielectric member in an interference fit to restrain said contact against axial and rotational movement within said axially extending bore;

each of said enlarged contact retaining portions having an electrical impedance between said enlarged contact retaining portion and said shell less than the characteristic electrical impedance of the remainder of said contact between said remainder of said contact and said shell, and said contact having an undercut portion of lesser diameter than the remainder of said contact between said enlarged retaining portions, said undercut portion being dimensioned to have a greater electrical impedance between said undercut portion and said shell than the characteristic electrical impedance of the remainder of said contact between said remainder of said contact and said shell and compensate for the lesser electrical impedance of said enlarged contact retaining portions.

9. The coaxial connector of claim 8 wherein said enlarged contact retaining portions are generally cylindrical in shape and concentrically formed with said contact, said enlarged contact retaining portions having a diameter greater than the diameter of the remainder of said contact and deforming said dielectric member thereabout to retain said contact in an interference fit in said axially extending bore to restrain said contact against axial movement, at least one of said enlarged contact retaining portions having a knurled outer surface for engaging said dielectric member to restrain said contact against rotational movement.

10. In an electrical connector having a first conductor with a characteristic electrical impedance between said first conductor and a second conductor disposed within an axially extending opening through a dielectric member disposed adjacent said second conductor, the improvement comprising:

means for captivating said first conductor within said axially extending opening in said dielectric member, said captivating means causing a discontinuity in said characteristic electrical impedance of said first conductor between said first conductor and said second conductor; and means for compensating for said discontinuity in said characteristic electrical impedance of said first conductor between said first conductor and said second conductor;

said captivating means including at least one low impedance zone between said captivating means and said second conductor and said compensating means includes at least one high-impedance zone between said compensating means and said second conductor, said high-impedance zone and said low-impedance zone providing impedance matching of said captivating means with said characteristic electrical impedance of said first conductor.

11. The improvement of claim 10 wherein said captivating means and said compensating means provide adjacent high-low-high impedance zones.

12. The improvement of claim 10 wherein said captivating means and said compensating means provide adjacent low-high-low impedance zones.

* * * * *